United States Patent [19]

Anselmann et al.

[11] 4,357,956
[45] Nov. 9, 1982

[54] SAFETY VALVE WITH VIBRATION-DAMPED VALVE SPRING

[75] Inventors: Hans Anselmann, Ladenburg; Kurt Mayer, Worms, both of Fed. Rep. of Germany

[73] Assignee: Bopp & Reuther GmbH, Mannheim, Fed. Rep. of Germany

[21] Appl. No.: 178,707

[22] Filed: Aug. 12, 1980

[51] Int. Cl.³ .............................................. F16K 15/06
[52] U.S. Cl. ................................... 137/514; 137/522; 137/529
[58] Field of Search ........................ 137/529, 522, 514

[56] References Cited

U.S. PATENT DOCUMENTS

| 103,062 | 5/1870 | Lynde | 137/522 X |
|---|---|---|---|
| 206,589 | 7/1878 | Lunkenheimer | 137/522 |
| 2,517,858 | 8/1950 | Farris | 137/522 X |
| 3,289,686 | 12/1966 | Tyer | 137/529 X |
| 3,543,777 | 12/1970 | Howes | 137/522 X |
| 3,848,632 | 11/1974 | Powell | 137/514 |
| 4,064,906 | 12/1977 | Berg | 137/529 |

FOREIGN PATENT DOCUMENTS 723375  2/1955  United Kingdom ................ 137/514

Primary Examiner—Robert G. Nilson
Attorney, Agent, or Firm—Michael J. Striker

[57] ABSTRACT

A spring-loaded safety valve has a housing with inlet and outlet, a valve member mobile between open and closed positions, a valve spring urging the valve member to the closed position and having a tendency to vibrate during the operation of the valve, and vibration-disturbing element for damping the vibrations of the valve spring during the operation of the valve. The vibration-disturbing element may be formed as a damping load or a damping spring which urges a valve spindle in direction of opening of the valve.

8 Claims, 2 Drawing Figures

SAFETY VALVE WITH VIBRATION-DAMPED VALVE SPRING

BACKGROUND OF THE INVENTION

The present invention relates to a safety valve. More particularly, it relates to a spring loaded safety valve, particularly for hot water and/or saturated vapor.

In hot water systems the medium in normal operational conditions exists in liquid form until it reaches a valve seat. During the operation of the safety valve, hot water first exits from the safety valve, and a vapor cushion generates in a boiler because of the lowering of the liquid level. A vapor/water mixture thereby exits from the safety valve in the second opening phase. In unfavorable cases pure saturated vapor can also generate.

For safety reasons, the safety valve must be designed for the most unfavorable case. For this reason, the free cross section of the safety valve for the saturated vapor medium must provide for a considerably greater space than for hot water. Thereby, the valve cross section in the region of hot water outlet is many times greater, so that here during opening of the safety valve a pressure breakdown immediately takes place, whereby the valve obtains an impulse for closing before it has been completely opened. After closing of the safety valve, the pressure builds in striking manner again and the valve again immediately opens. Three openings and closings in fractions of seconds cause vibrations of the valve spring, whereby the safety valve begins to flutter. The frequency of 100 hertz and more can be reached. The above-mentioned valve flutter can result in damages to the system.

SUMMARY OF THE INVENTION

Accordingly, it is an object of the present invention to provide a safety valve which avoids the disadvantages of the prior art.

More particularly, it is an object of the present invention to provide a safety valve in which vibrations of the valve spring causing flutter, can be eliminated.

In keeping with these objects and with others which will become apparent hereinafter, one feature of the present invention resides, briefly stated, in a safety valve which has a housing with inlet and outlet, a valve member movable between open and closed positions, a valve spring urging the valve member to the closed position and having a tendency to vibrate, wherein means is provided for damping the vibration of the valve spring during the operation of the valve. The damping means includes a vibration-disturbing element arranged so as to constantly urge the valve member to the open position. More particularly, the vibration-disturbing element may be arranged so as to urge the valve shaft to the open position.

When the safety valve is designed in accordance with the present invention so that the vibration-disturbing element acts in direction of opening of the valve, the tendency of the valve spring to vibrate during very fast alternative openings and closings in suppressed in the very beginning, so that the vibrations cannot amplify. A flutter of the safety valve and resulting damage to the system are thereby avoided.

In accordance with another feature of the present invention, the valve spring is prestressed with a force which corresponds to the force with which the vibration-disturbing element urges the valve member to the open position. When the valve spring is so prestressed, reaction time of the safety valve does not change under the action of the vibration-disturbing element.

In accordance with still another advantageous feature of the present invention, the vibration-disturbing element includes a damping load or a damping spring acting upon the valve shaft in direction toward the open position. More particularly, the damping load or the damping spring abuts against an abutment portion of the valve shaft so as to urge the latter to the open position. Thereby, the suppression of the vibrations of the valve spring is attained by simple means. The mass of the damping load acts in braking sense on the vibrations of the valve spring, whereas the damping spring acts so that its frequency counteracts the frequency of the valve spring.

A further feature of the present invention resides in that the damping load is arranged at the end of a lifting lever of a lifting arrangement, or the lifting lever proper forms the damping load. The force transmission to the abutment of the valve shaft is attained via a lifting shaft and a lifting cam of the lifting arrangement. Thereby, the vibration-disturbing member can be manufactured inexpensively and subsequently attached to the lifting arrangement of the safety valve.

Still a further feature of the present invention is that the damping spring is located between a tightening screw arranged in an upper portion of a valve spring casing, on the one hand, and the abutment portion of the valve shaft. The abutment portion may be formed as a nut which is screwed onto the valve shaft.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
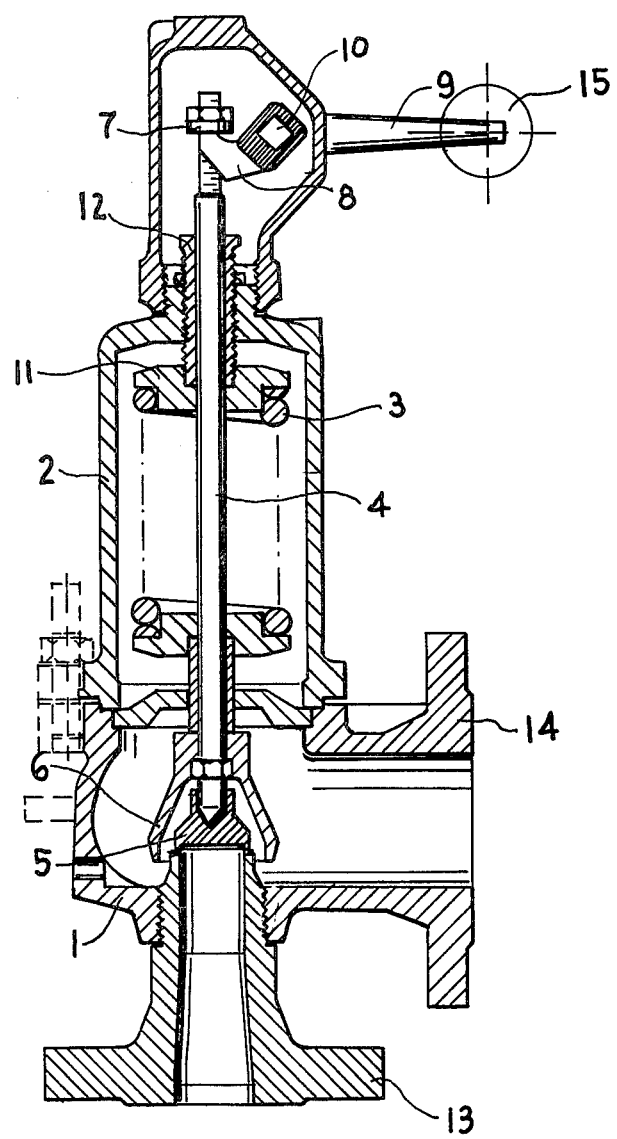
FIG. 1 is a view showing a longitudinal section of a spring-loaded safety valve in accordance with the present invention, with a damping load for damping vibrations of a valve spring.
Figure 2:
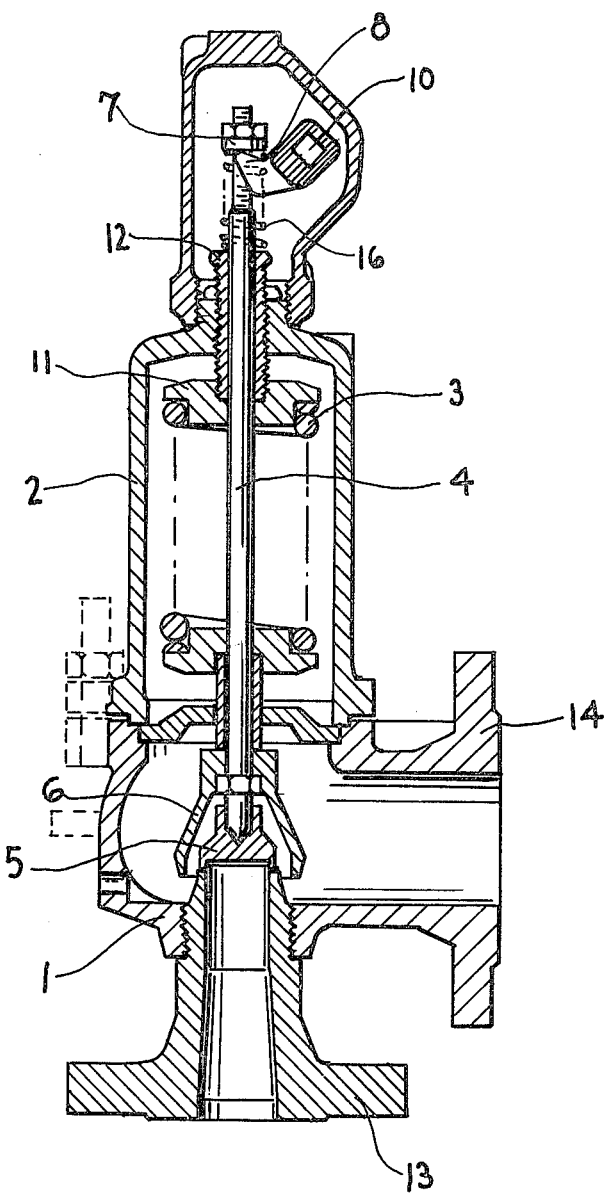
FIG. 2 is a view substantially corresponding to that of FIG. 1, but showing a damping spring which performs the function of the damping load of the safety valve shown in FIG. 1.

A spring loaded safety valve in accordance with the present invention is shown in FIGS. 1 and 2 and has a valve housing which is identified by reference numeral 1 and a spring casing 2 in which a valve spring 3 is accommodated.

A valve spindle 4 is provided and extends in a vertical direction in the drawing. A valve closing piece 5 is arranged at the lower end of the valve spindle 4 and surrounded by a bell member 6. An abutment is provided at the upper end of the valve spindle. The abutment is formed as a lifting nut 7 which is screwed onto the valve spindle. The lifting nut 7 is arranged for engagement with a lifting cam 8 of a lifting arrangement. The lifting cam 8 engages the lifting nut 7 from below so as to urge the same in direction of opening of the valve.

The lifting cam 8 is formed of one piece with a lifting lever 9. The lifting lever 9 is a two-arm lever and pivotally mounted on a lifting shaft 10. The pressure of response of the valve spring 4 can be adjusted by displacement of an upper spring plate 11 over a tightening screw 12. The tightening screw 12 is arranged in a head of the spring casing 2. The hot water and/or saturated vapor enters the valve via an inlet pipe 13 and exits the same via an outlet pipe 14.

The safety valve in accordance with the present invention is provided with means for damping the vibrations of the valve spring 3. This means includes a vibration-disturbing element which is operative for urging the valve spindle 4 to the open position of the valve. In the safety valve shown in FIG. 1, the vibration-disturbing element is formed as a damping load 15. The damping load 15 is mounted on the end portion of the lifting lever 9 of the lifting arrangement. The damping load 15 acts via the lifting lever 9 and the lifting cam 8 constantly on the lifting nut 7 from below or in otherwords in the opening direction of the valve. Thereby, it also acts on the valve spindle 4 in the opening direction.

As a result of this, the tendency of the valve spring 3 to vibrate is transferred to the damping load 15 whose mass suppresses the vibrations of the valve spring 3.

In the safety valve shown in FIG. 2, the vibration-disturbing element is formed as a damping spring 16. The damping spring 16 is fitted on the upper end of the valve spindle 4. The damping spring 6 abuts against a shoulder of the tightening screw 12, on the one hand, and against the lifting nut 7, on the other hand. Thereby, the damping spring 16 acts on the valve spindle 4 in the opening direction of the valve. As a result of this, the different frequencies of the damping spring 16 and the valve spring 3 superimpose over one another and the vibrations of the valve spring 3 are suppressed.

It will be understood that each of the elements described above, or two or more together, may also find a useful application in other types of constructions differing from the types described above.

While the invention has been illustrated and described as embodied in a spring-loaded safety valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A safety valve, comprising a housing having inlet and outlet means; a valve spindle; a valve member mounted on said valve spindle and movable together with the latter between an open position in which it allows communication between said inlet and outlet means, and a closed position in which it interrupts the same; a valve spring urging said valve member to said closed position and having a tendency to vibrate during the operation of the valve; lifting means arranged to lift said valve spindle and thereby said valve member to said open position and having a lifting lever; and means for damping the vibrations of said valve spring during the operation of the valve, said damping means including a vibration-disturbing element formed as a damping weight which is provided on said lifting lever of said lifting means and constantly urges said lifting lever and thereby said valve spindle together with said valve member to said open position.

2. A safety valve as defined in claim 1, wherein said valve spindle has an abutment portion, said lifting means being arranged to abut against said abutment portion so as to urge said valve spindle to said open position of said valve member.

3. A safety valve as defined in claim 2, wherein said abutment member is a nut which is screwed on said valve spindle.

4. A safety valve as defined in claim 2, wherein said lifting means includes a lifting cam arranged to abut against said abutment portion of said valve spindle, and a lifting shaft connecting said lifting lever with said lifting cam, so that the force of abutment against said abutment portion of said valve spindle is transmitted through said lifting shaft and said lifting cam.

5. A safety valve as defined in claim 1, wherein said lifting lever forms said damping weight.

6. A safety valve, comprising a housing having inlet and outlet means; a valve spindle; a valve member mounted on said valve spindle movable together with the latter between an open position in which it allows communication between said inlet and outlet means, and a closed position in which it interrupts the same; a valve spring urging said valve member to said closed position and having a tendency to vibrate during the operation of the valve; lifting means arranged to lift said valve spindle and thereby said valve member to said open position, said lifting means including an abutment member provided on said valve spindle and formed as a lifting nut and a lifting member acting upon said lifting nut; a casing surrounding said valve spring; a tightening screw arranged in said casing and tightening said valve spring; and means for damping the vibrations of said valve spring during the operation of the valve, said damping means including a damping spring extending between said tightening screw of said valve spring and said lifting nut of said lifting means so as to constantly urge said lifting lever and thereby said valve spindle together with said valve member to said open position, and having a frequency differing from that of said valve spring, so that the different frequencies of said damping spring and said valve spring superimpose over one another and the vibrations of said valve spring are suppressed.

7. A safety valve as defined in claim 6, wherein said casing has a lower portion connected with said housing and an upper portion spaced therefrom, said damping spring being located between said upper portion of said casing and said lifting nut of said lifting means.

8. A safety valve, comprising a housing having inlet and outlet means; a valve spindle; a valve member mounted on said valve spindle and movable together with the latter between an open position in which it allows communication between said inlet and outlet means, and a closed position in which it interrupts the same; a valve spring urging said valve member to said closed position and having a tendency to vibrate during the operation of the valve; lifting means arranged to lift said valve spindle and thereby said valve member to said open position and having a lifting lever; and means for damping the vibrations of said valve spring during the operation of the valve, said damping means including a vibration-disturbing element formed as a damping weight which is provided on said lifting lever of said lifting means and constantly urges said lifting lever and thereby said valve spindle together with said valve member to said open position, said lifting lever having an end section provided with a separate member forming said damping weight.

* * * * *